United States Patent [19]

Teschke

[11] Patent Number: 4,699,089
[45] Date of Patent: Oct. 13, 1987

[54] PET FEEDER

[76] Inventor: Gloria M. Teschke, Rte. 3, Box 6566, Twin Falls, Id. 83301

[21] Appl. No.: 924,811

[22] Filed: Oct. 30, 1986

[51] Int. Cl.$^4$ .......................... A01K 5/00; A01K 7/00
[52] U.S. Cl. .................................. 119/51.5; 119/51 R
[58] Field of Search .................. 119/61 R, 51.5, 51 R, 119/52 R, 72

[56] References Cited

U.S. PATENT DOCUMENTS

| | | | |
|---|---|---|---|
| 2,555,396 | 3/1951 | Cosner | 119/51.5 |
| 2,659,345 | 11/1953 | Herbert | 119/15 |
| 2,845,896 | 6/1956 | Copeland | 119/51 |
| 3,195,510 | 7/1965 | Bernstein | 119/61 |
| 3,651,787 | 3/1972 | Cooper | 119/51.5 |
| 4,022,160 | 5/1977 | Lester | 119/61 |
| 4,044,723 | 8/1977 | Fitzpatrick | 119/61 |
| 4,065,195 | 12/1977 | Fahmie | 119/61 |
| 4,532,891 | 8/1985 | Jones | 119/51.5 |
| 4,633,815 | 1/1987 | Peterson et al. | 119/72 |

FOREIGN PATENT DOCUMENTS 3300770 7/1984 Fed. Rep. of Germany ........ 119/61

Primary Examiner—Paul J. Hirsch
Attorney, Agent, or Firm—Paul F. Horton

[57] ABSTRACT

A pet feeder, particularly for pet dogs, including a storage container for storage of food and accessories and a removable feeding table which prevents access by the pet to the storage container when the pet is feeding and which is removable from the storage container only be vertically upward displacement. The feeding table is provided with a plurality of removable food and water bowls and with a splashboard along the rear and sides of the feeding table.

8 Claims, 3 Drawing Figures

PET FEEDER

BACKGROUND OF THE INVENTION

1. Field of the Invention

This invention relates, in general, to feeding cabinets for pets and, in particular, to cabinets having removable bowls and trays.

2. Description of the Prior Art

The desirability of having feeders for pets has long been recognized. Without feeders, food and water bowls are often upended by the pet or by the owner resulting in unsanitary conditions both for the pet and the owner. Feeders also preferably provide storage for food as well at pet accessories. Typical of feeding trays are those of W. F. Grant, U.S. Pat. No. 2,841,114; P. E. Cooper, U.S. Pat. No. 3,651,787; and R. O. Jones, U.S. Pat. No. 4,532,891, none of which provide storage.

Typical of feeders with storage are those of E. P. Cosner, U.S. Pat. No. 2,555,396; G. H. Herbert, U.S. Pat. No. 2,659,345 and E. Copeland, U.S. Pat. No. 2,845,896.

The Cosner device has a container which is permanently attached to the feeding tray and therefore does not permit removal of the tray for cleaning. Further, access to the storage compartment is by removal of a vertical slide, which if left in the open position, as it might be during feeding, permits entry by the pet. The Herbert device has a sliding tray with individual storage, much in the nature of the Cosner device and with the same problems. The feeding cabinet of Copeland includes a food holding unit which is withdrawn from a storage cabinet during the feeding process. During the feeding process, the pet is, by nature of the design of the cabinet, allowed free access to the storage compartment, which may result in the pet eating too much of the wrong type of foods besides creating a mess in the storage area.

SUMMARY OF THE INVENTION

The present invention provides a pet feeder which has a storage container with a top opening for ready access; the contents being readily viewed and obtained without being subject to any sliding movement or other disturbance which might otherwise cause spillage of opened cans or bags of food. The present invention also provides a feeding table which, when in place, as it must be in the feeding mode, prevents access to the storage compartment by the pet. The feeding table, being removable only by lifting vertically from the storage container, cannot be overturned by the pet, yet allows ready removal by the pet's owner for cleaning and maintenance. The storage container, with the feeding table placed thereon, is constructed to be of a height which permits the pet to feed at a comfortable height and the feeding table is provided with a splash board along the sides and rear to aid in sanitation and cleanliness.

Additional objects and advantages will become apparent and a more thorough and comprehensive understanding may be had from the following description taken in conjunction with the accompanying drawings forming a part of this specification.

BRIEF DESCRIPTION OF THE DAWINGS

DETAILED DESCRIPTION OF THE INVENTION

Figure 1:
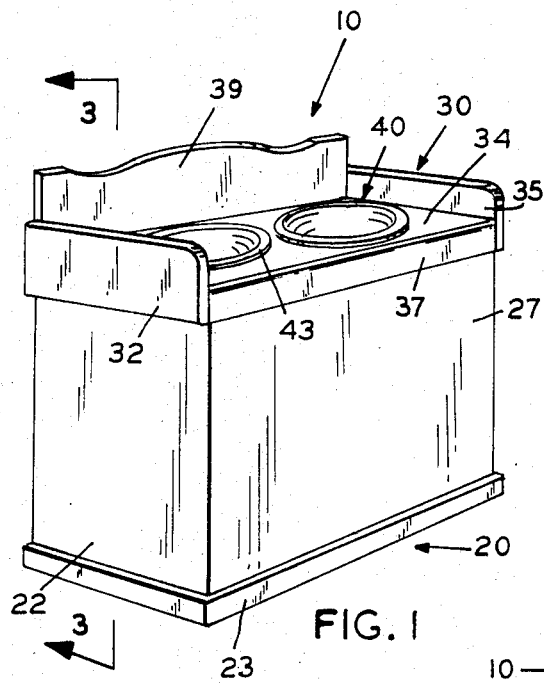
FIG. 1 is a perspective view of a preferred embodiment of the present invention.

Referring now to the drawings, an embodiment to be preferred of a pet feeder 10 made according to the present invention is disclosed. Feeder 10 includes, generally, a storage container 20; a feeding table 30 placed thereupon; and a plurality of feeding and watering bowls 40 inserted into the feeding table.

Storage container 20 is a box having a horizontal bottom plate 24; a pair of vertical opposing side walls 22 and 25; a vertical front wall 27; and a vertical rear wall 29. The box has a top opening 28 for ready access to pet food or accessories which may be stored in the container. The container is constructed preferably of wood and may be provided with a kick plate 23. The length and width of the container may be of any suitable size with a length of twenty four inches and a width of twelve inches being contemplated. The container will be of a height suitable to the particular pet for which it is constructed.

Figure 2:
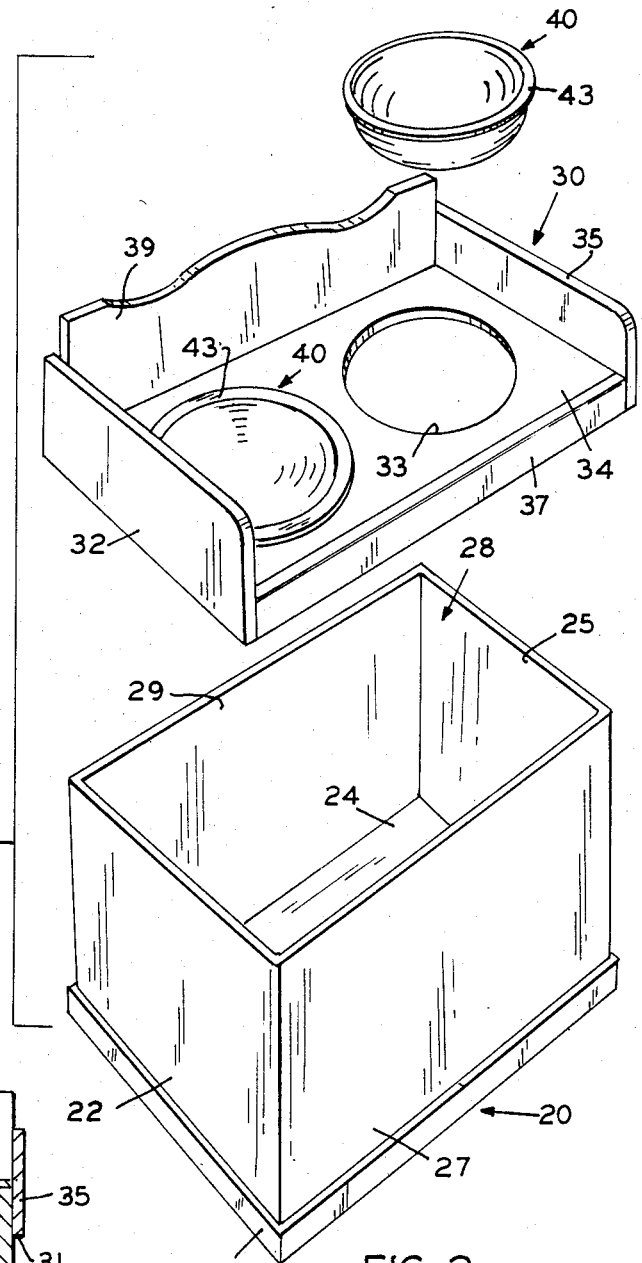
FIG. 2 is an exploded perspective view of the pet feeder shown in FIG. 1.
Figure 3:
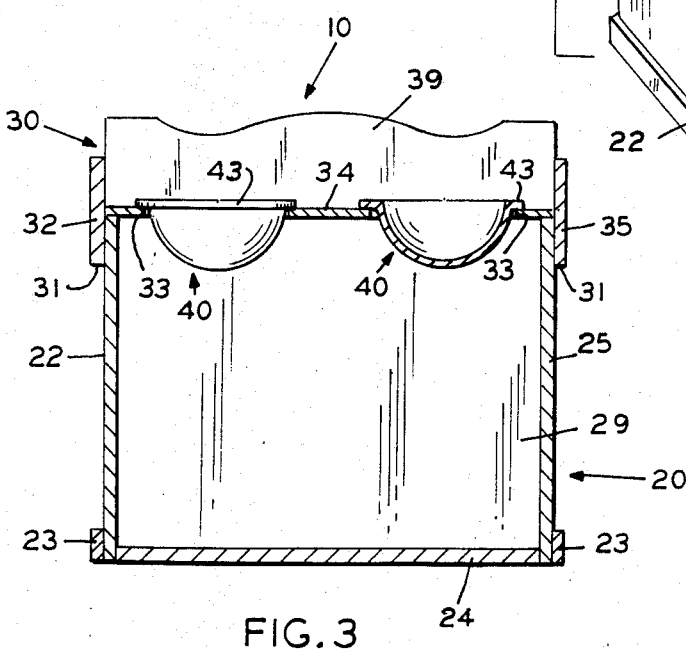
FIG. 3 is a sectional view taken along lines 3—3 of FIG. 1.

Removably mounted on the top of storage container 20 is feeding table 30. The feeding table is also preferably constructed entirely of wood. The feeding table includes a horizontal top plate 34 having two or more laterally spaced apertures 33 cut therein for the reception of feeding bowls 40. Top plate 34 is of sufficient size to rest upon the upper edges of each of the sidewalls of the container. Downwardly depending from the top plate is lateral retention means in the form of a front retention plate 37, a rear retention plate 39 and opposing side retention plates 32 and 35. The retention plates extend below the bottom surface of the horizontal top plate 34 to engage the outer surfaces of the storage container, ie., the exterior surfaces of each of the walls of storage container 20, as shown to advantage in FIG. 2. While the retention plates could engage the interior surfaces of the walls to prevent lateral movement, the advantages of exterior wall engagement will become apparent. It will be noted, then, that all lateral motion of the feeding table relative to the storage container is prevented and that the feeding table can be removed from the storage container only by vertical lifting of the table from the container. For lifting, each of the retention plates terminate at their lower most edge in a planar portion to define handles 31 for easy grasping.

Side retention plates 32 and 35, together with rear retention plate 39, extend above the top surface of top late 34 at a suitable distance of three to four inches to define a splash board for preventing food or liquid from spilling from the rear and sides of the table.

Feeding bowls 40 are preferably constructed of stainless steel and have a peripheral lip 43 which is flush with and snugly engages the top surface of top plate 34 to prevent spillage into the storage compartment below. The bowls may be of any suitable diameter, it being contemplated that bowls having a diameter of eight or nine inches will be used for pet dogs.

Fot cleaning, the table 30 is simply grasped by handles 31 and lifted vertically upward and then taken to a sink or other cleaning area. Feeding bowls 40 are then removed from apertures 33 of the top plate for cleaning and then replaced. Fresh food, at this time, may be obtained from the storage container. It will be appreciated that the food containers are easily viewed and removed from the top opening of the container. It is also obvious that open sacks or cans of food can be easily placed into the storage container without fear that the food will be knocked over, as by sliding drawers.

For feeding, fresh food and water is poured into bowls 40 and the table 30 replaced upon storage container 20. When in the feeding mode, it will be appreciated that the container is completely closed, as it must be, with the interior surfaces of the retention plates engaging the exterior suraces of the walls of the storage container, and it is impossible for the pet to get into food or accessories which may be stored in the container.

Having thus described in detail a preferred embodiment of the the pesent invention, it is to be appreciated and will be apparent to those skilled in the art that other physical changes could be made in the apparatus without altering the inventive concepts and principles embodied therein. Th present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A pet feder comprising:
a storae container having a horizontal bottom plate, a pair of vertcal opposing side walls and vertical opposing front and rear walls to define a top opening access to said storage continer;
a feeding table removably mounted on said storage container to close said access when in the feeding mode, said table having at least two feeding bowl receiving apertures; and
a plurality of feeding bowls, each bowl received within a respective aperture.

2. The apparatus as described in claim 1 wherein said feeding table includes a horizontal top plate having two or more laterally spaced apertures, each aperture operable to receive a feeding bowl, and four retention plates including two opposing front and rear plates and two opposing side plates, each plate downwardly extending from said horizontal plate, each of said retention plates operable to engage a respective wall of said storage container for preventing lateral movement of said feeding table relative to said storage container.

3. The apparatus as described in claim 2 wherein each of said retention plates engage each of said respective walls of said storage container on the exterior surfaces of said walls and wherein at least two opposing retention plates, at their lowermost ends define handles for vertically lifting and removing said feeding table from said storage container.

4. The apparatus as described in claim 3 wherein the two opposing side retention plates and the rear retention plate extend above said horizontal top plate to define a splash board.

5. A pet feeder comprising:
a storage container having a horizontal bottom plate, a pair of vertical opposing side walls and vertical opposing front and rear walls to define a top opening for access to said storage container;
a feeding table removably mounted on said storage container to close said top opening when in the feeding mode, said table including a horizontal top plate having two or more apertures for receiving feeding bowls; lateral retention means to prevent lateral movement of said table relative to said storage container; and a splash board affixed to the sides and rear of said horizontal top plate; and
a plurality of feeding bowls, each feeding bowl removably insertable into a respective aperture of said horizontal top plate of said feeding table.

6. The apparatus as described in claim 5 wherein said lateral retention means includes opposing front and rear retention plates and opposing side retention plates, said retention plates downwardly depending from said horizontal top plate and each of said retention plates operable to engage the exterior surface of a respective wall of said storage container to prevent lateral movement relative thereto.

7. The apparatus as described in claim 6 wherein said splash board is integral with said side retention plates and said rear retention plate.

8. The apparatus as described in claim 6 wherein the lowermost edge of each of said retention plates is provided with grasping means for the mounting and removal of said feeding table on said storage means.

* * * * *